(12) United States Patent
Scharfenberg et al.

(10) Patent No.: US 10,071,414 B2
(45) Date of Patent: Sep. 11, 2018

(54) TOOL AND METHOD FOR PROCESSING A WORKPIECE WITH A TOOL ELEMENT OF A TOOL

(71) Applicant: Robert Bosch GmbH, Stuttgart (DE)

(72) Inventors: Andreas Scharfenberg, Murrhardt (DE); Manfred Zurawski, Gschwend (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 14/966,013

(22) Filed: Dec. 11, 2015

(65) Prior Publication Data

US 2016/0175920 A1 Jun. 23, 2016

(30) Foreign Application Priority Data

Dec. 17, 2014 (DE) .................... 10 2014 226 162

(51) Int. Cl.
| | | |
|---|---|---|
| *B21J 15/28* | (2006.01) | |
| *B25F 5/00* | (2006.01) | |
| *B21J 15/10* | (2006.01) | |
| *B23Q 17/22* | (2006.01) | |
| *B21J 15/04* | (2006.01) | |
| *B21J 15/26* | (2006.01) | |
| *B21J 15/32* | (2006.01) | |

(52) U.S. Cl.
CPC ............ *B21J 15/28* (2013.01); *B21J 15/043* (2013.01); *B21J 15/105* (2013.01); *B21J 15/26* (2013.01); *B21J 15/285* (2013.01); *B21J 15/326* (2013.01); *B23Q 17/22* (2013.01); *B25F 5/00* (2013.01)

(58) Field of Classification Search
None
See application file for complete search history.

(56) References Cited

U.S. PATENT DOCUMENTS 5,473,805 A * 12/1995 Wille ................. B21J 15/26
227/55
2005/0217097 A1* 10/2005 Solfronk ............. B21J 15/043
29/243.521
(Continued)

FOREIGN PATENT DOCUMENTS

DE         43 36 730 A1   5/1995
DE   20 2008 002 247 U1   8/2008
(Continued)

OTHER PUBLICATIONS

DE 202008002247 Mach Translation attached as pdf.*
(Continued)

*Primary Examiner* — Joseph J Hail
*Assistant Examiner* — Brian D Keller
(74) *Attorney, Agent, or Firm* — Maginot, Moore & Beck LLP

(57) ABSTRACT

A tool for processing a workpiece has a tool element for processing the workpiece and a control device. The control device is configured to evaluate a rotation angle, which is detected by a detection device, and with which the tool is arranged in space, after a processing operation of the workpiece has been carried out with the tool element. The control device is also configured to release the control of the tool in a manner dependent on whether the tool has been arranged in space with a predetermined rotation angle after the workpiece has been processed.

11 Claims, 2 Drawing Sheets

(56) References Cited

U.S. PATENT DOCUMENTS

| | | | |
|---|---|---|---|
| 2006/0076385 A1* | 4/2006 | Etter | B23B 25/06 227/2 |
| 2011/0203821 A1* | 8/2011 | Puzio | B25B 23/0064 173/1 |
| 2015/0040373 A1* | 2/2015 | Chen | B21J 15/02 29/525.06 |

FOREIGN PATENT DOCUMENTS

| | | |
|---|---|---|
| DE | 10 2010 034 151 A1 | 2/2012 |
| WO | 2012/025521 A2 | 3/2012 |

OTHER PUBLICATIONS

DE 1002010034151 Descr Mach Translation attached as pdf.*
German Search Report corresponding to German Application No. 10 2014 226 162.7; dated Aug. 5, 2015; 9 pages; München, Germany.

* cited by examiner

TOOL AND METHOD FOR PROCESSING A WORKPIECE WITH A TOOL ELEMENT OF A TOOL

This application claims priority under 35 U.S.C. § 119 to patent application number DE 10 2014 226 162.7, filed on Dec. 17, 2014 in Germany, the disclosure of which is incorporated herein by reference in its entirety.

BACKGROUND

The present disclosure relates to a tool and a method for processing a workpiece with a tool element of a tool.

In production installations, such as production lines for vehicles, in particular motor vehicles, aircraft, etc., items of furniture, etc., there are often used tools which process workpieces. Such tools are, for example, riveting tools or screwing tools or drilling tools, punching tools, etc. In this instance, such a tool connects, for example, two ends of a workpiece or two or more workpieces to each other with a rivet or a screw. Alternatively, an opening is drilled or punched in the workpiece with the tool.

In the case of batch production in production installations, on the one hand, an operation is often carried out repeatedly, often for each of the objects to be produced. Furthermore, it is necessary in this instance, for the durability of the tools used, for the processing of the workpieces to be carried out with the tools in a predetermined manner.

In particular in a blind rivet setting device after a riveting operation of a rivet on one or more workpieces, there is torn off a mandrel which is intended to be safely removed into a mandrel container. For example, to this end it is possible to tilt the blind rivet setting device backward after each riveting operation so that the torn-off mandrel is guided backward into the mandrel container by gravitational force. However, if the blind rivet setting device is not tilted backward after each riveting operation, a mandrel blockage may be produced in the blind rivet setting device, whereby the blind rivet setting device fails and has to be maintained.

SUMMARY

Therefore, an object of the present disclosure is to provide a tool and a method for processing a workpiece with a tool element of a tool with which the above-mentioned problems can be solved. In particular, there are intended to be provided a tool and a method for processing a workpiece with a tool element of a tool, in which a failure of the tool is prevented and the durability of the tool is increased.

This object is achieved by a tool according to the following description.

The following description sets out advantageous additional embodiments of the tool.

With the tool, it is possible to detect a selective tipping of the tool, in particular backward, and/or a rotation of the tool in a predetermined direction and through a predetermined rotation angle. As a result, it is possible to ensure a reliable removal of a mandrel which has been torn off a rivet which is set in the workpiece into a mandrel container. This can be used in a similar manner, for example, for a punching tool or another tool. If a user of the tool does not comply with this procedure, the user is prevented from starting a new riveting operation. Consequently, the tool ensures that each mandrel is transported individually into the mandrel container. As a result, a mandrel blockage in the tool can be reliably prevented.

Consequently, the tool allows a failure of the tool to be prevented as a result of a rivet blockage in the tool. Maintenance of the tool as a result of a mandrel blockage in the tool is thereby prevented, whereby generally the durability of the above-described tool is substantially improved.

The object is further achieved by a method for processing a workpiece with a tool element of a tool according to the following description.

The method achieves the same advantages as are set out above in relation to the tool.

Additional possible implementations of the disclosure also comprise combinations which are not explicitly mentioned of features or embodiments which are described above or below with respect to the embodiments. In this instance, the person skilled in the art will also add individual aspects as improvements or supplements to the respective basic form of the disclosure.

BRIEF DESCRIPTION OF THE DRAWINGS

The disclosure is described in greater detail below with reference to the appended drawings and embodiments. In the drawings.

DETAILED DESCRIPTION

Figure 1:
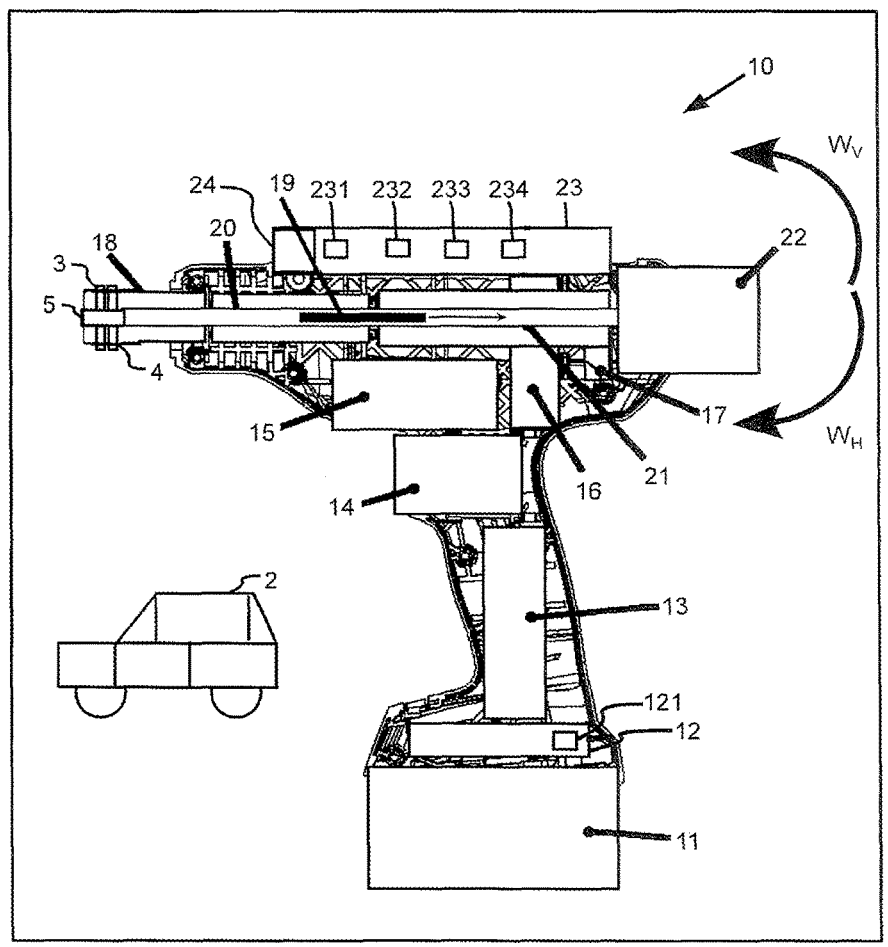
FIG. 1 is a simplified view of a production installation with a tool according to a first embodiment.

FIG. 1 is a highly schematic view of a production installation 1 for producing objects 2, a tool 10 being used to process workpieces 3, 4, for example, to set rivets 5, in particular blind rivets. The workpieces 3, 4 may be, for example, bodywork portions of a vehicle as the objects 2, the workpieces 3, 4 being connected with the rivets 5. In this instance, the tool 10 may, for example, connect two ends of the workpiece 3 or connect the workpieces 3, 4, or additional workpieces which are not illustrated, to each other with a rivet 5. The tool 10 is therefore a rivet tool and in particular a blind rivet setting device in this example.

The tool 10 has an electrical power supply 11, an electrical power supply interface 12 with an electronic power unit 121, a cable harness 13, a start switch 14, a drive device 15, a gear mechanism 16, in particular with offset, a displacement sensor 17, a mouthpiece acting as a tool element 18 for receiving a fixing element 5, 19, a force sensor 20 with an aperture for a portion 19 of the fixing element 5, 19, a trapezoidal rotating spindle or ball screw 21 with an aperture for the portion 19 of the fixing element 5, 19, a container 22 which is in particular a mandrel container, a control device 23 and an input device 24. In the control device 23 there are provided a communication module 231, a detection device 232 and a display device 233, such as, for example, a display.

A value for a predetermined rotation angle 234 is stored in the control device 23. The predetermined rotation angle 234 is a rotation angle through which the tool 10 starting from the position thereof during the riveting operation, that is to say, a processing operation of the tool 10, is arranged in space after the workpiece 3, 4 has been processed with the tool element 18 so that a movement of the portion 19 of the fixing element 5, 19 into the container 22 is ensured. The control device 23 can be constructed as an electronic control unit. The detection device 232 is in particular integrated in the control device 23.

In the tool 10, the electrical power supply 11 can be produced by means of a power unit or by means of a battery, in particular a non-rechargeable or rechargeable battery (accumulator). In the tool element 18, a rivet 5 with a mandrel is used in the tool 10 as the fixing element 5, 19 by way of example. The mandrel is torn off after the rivet 5 is set, that is to say, after the workpiece 3, 4 has been processed, with the tool element 18.

As already described above, in particular bodywork components of the vehicles can be riveted as objects 2 with the tool 10. To this end, the tool 10 is arranged on the workpiece (s) 3, 4 with the rivet 5 as perpendicular as possible, as shown in FIG. 1. In this instance, the tool 10 can also be arranged from above, from below or laterally on the workpiece(s) 3, 4.

FIG. 1 illustrates the state during the riveting operation. The tool 10 with the fixing element 5, 19 inserted is positioned perpendicularly to the workpieces 3, 4. When the start switch 14 is actuated, the rivet 5 becomes deformed and connects the workpiece(s) 3, 4 to each other, wherein the other portion 19 of the fixing element 5, 19, the mandrel, is torn off the rivet 5, as described above.

In order to ensure that the torn-off mandrel can be conveyed from the tool element 18 into the container 22, the force sensor 20 and the trapezoidal rotating spindle or ball screw 21 are each provided with the aperture mentioned. The aperture may be, for example, a bore.

Figure 2:
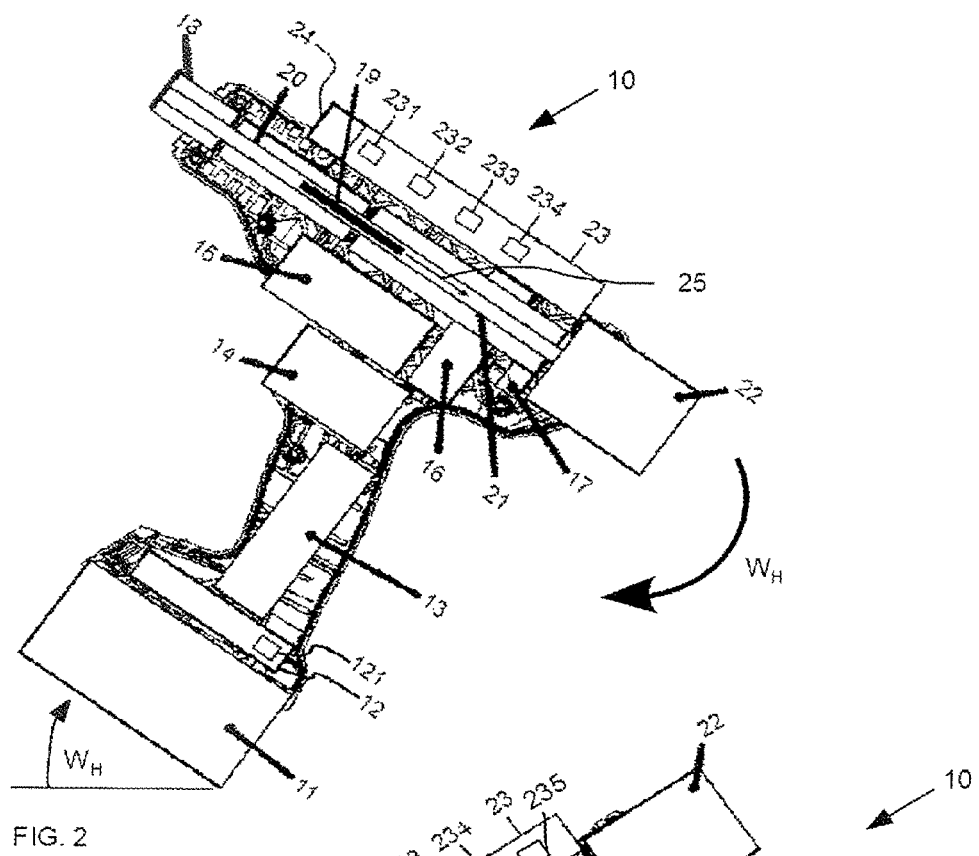
FIG. 2 is a simplified view of a tool according to the first embodiment.

FIG. 2 shows how the portion of the fixing element 19 torn off the rivet 5 moves in the direction of the container 22 after a riveting operation. To this end, the tool 10 is rotated about a rotation angle WH about a predetermined axis after the riveting operation. The portion of the fixing element 19, the mandrel, can thereby slide away from the tool element 18 in the direction of the arrow designated 25 through the aperture of the force sensor 20 and the trapezoidal rotating spindle or ball screw 21 into the container 22. The rotation angle $W_H$ illustrated in FIG. 2 corresponds to the predetermined rotation angle 234, at which the sliding action of the portion of the fixing element 19, the mandrel, into the container 22 is ensured.

The rotation angle $W_H$ of the tool 10 is detected by the detection device 232 which is, for example, an acceleration sensor. In this instance, the detection device 232 detects a rotation angle $W_H$, with which the tool 10 is arranged in space.

If the tool 10 is not arranged or is arranged only partially with the rotation angle WH or in another direction after a riveting operation, the rotation angle WH of the tool 10 detected by the detection device 232 differs from the predetermined rotation angle 234 which is stored in the control device 23. Therefore, an evaluation of the control device 23 results in the situation that the next riveting operation may not be released. That means that no riveting operation with the tool 10 is carried out, even in the case of actuation of the start switch 14 of the tool 10, for example, by a user of the tool. In addition, a warning, for example, a visual signal, an acoustic signal, a vibration on the tool 10, etc., can be output with the display device 233 if the tool 10 has not been rotated through the predetermined rotation angle 234 after the workpiece 3, 4 has been processed.

Furthermore, a different or changed predetermined rotation angle 234 can be input by a user by means of the input device 24. The predetermined rotation angle 234 can consequently be parameterised and is not only preset ex works.

In this instance, however, it is preferable for the predetermined rotation angle 234 to have such a value that the portion 19 of the fixing element 5, 19 can slide reliably off into the container 22 after the workpiece 3, 4 has been processed with the tool 10. The tool 10 is consequently always arranged in space at the optimum rotation angle WH after the workpiece 3, 4 has been processed in order to release a new riveting operation without any damage to the tool 10.

Consequently, the necessary tilting of the tool 10 can be parameterized, wherein the minimum rotation angle through which the device has to be tilted backward between the riveting operations is adjusted.

An evaluation of the signals of the detection device is thereby brought about in such a manner, with the tool 10, or more specifically the control device 23 thereof, that the tool 10 is tilted backward once in a reliable manner between two riveting operations. The release of the following start of a riveting operation is therefore carried out only after the previous tilting of the tool 10 for the reliable removal of the mandrel or portion 19.

Figure 3:
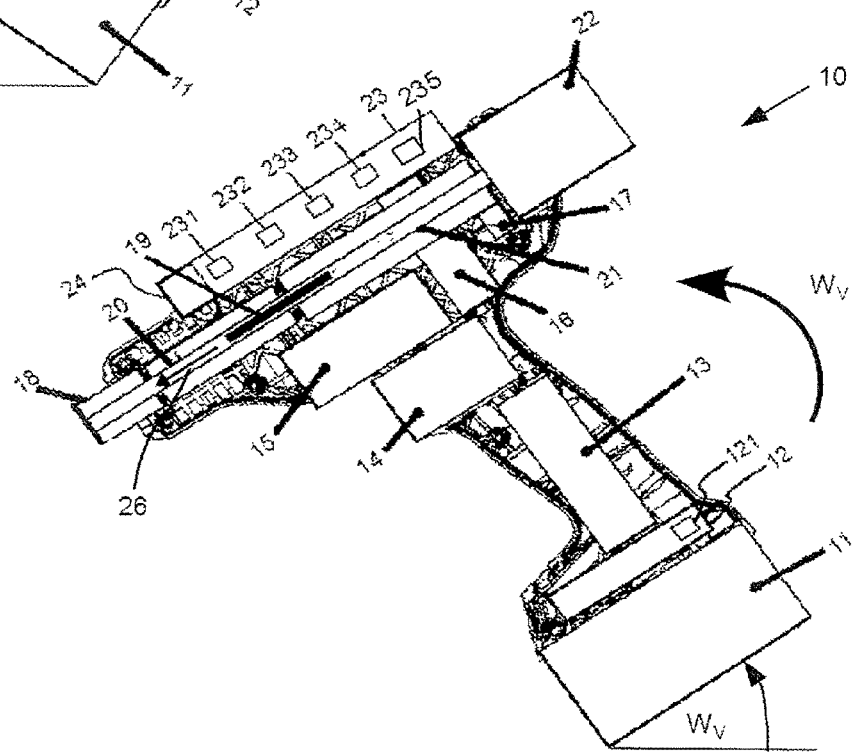
FIG. 3 is a simplified view of a tool according to a second embodiment.

FIG. 3 shows a position of the tool 10 for illustrating a second embodiment of the tool 10. As shown in FIG. 3, it may be the case that the tool 10 is rotated forward after the riveting operation, for example, about a rotation angle WV. In this instance, the portion 19 of the fixing element 5, 19 moves after a riveting operation in the direction of an arrow 26 out of the tool element 18 of the tool 10.

This results in the portion 19, the mandrel, not reaching the container 22, but instead falling beside the tool 10. In order to prevent this, in the present embodiment a second predetermined rotation angle 235 is stored in the control device 23. The second predetermined rotation angle 235 is selected in such a manner that the portion 19, the mandrel, is prevented from sliding off, as shown in FIG. 3. The second predetermined rotation angle 235 therefore has a smaller value than the rotation angle WV shown in FIG. 3.

If the detection device 232 in the present embodiment detects a rotation movement of the tool 10 through the second predetermined rotation angle 235 after the workpiece 3, 4 has been processed without the fixing element 19 being previously removed into the container 22, a signal is output to the display device 233 by the control device 23. Consequently, a warning signal, for example, a visual signal, an acoustic signal, a vibration on the tool 10, etc., is displayed with the display device 233 on the tool 10 in order to warn the user of the tool 10. The display device 233 therefore indicates whether the tool 10 is, after a workpiece 3, 4 has been processed, rotated through the predetermined second rotation angle 235 at which the portion 19 can fall out of the tool 10 in the case of the predetermined second rotation angle 235 being further exceeded.

Consequently, it is made clear to the user of the tool 10 that he has to tilt the tool 10 backward in order to prevent the portion 19 or mandrel from potentially falling out in a forward direction.

The second predetermined rotation angle 235 can also be parameterised by means of the input device 24. As a result, the second predetermined rotation angle 235 can also be freely selected by the user.

Otherwise, the tool 10 is constructed in accordance with the present embodiment, as described in the first embodiment.

With the present embodiment, therefore, it is possible to determine when a warning signal is intended to be output in relation to the removal of the portion 19 of the fixing element 5, 19. A warning signal on the tool 10 is thereby not triggered for each small rotation movement of the tool 10 after one or more workpiece(s) 3, 4 has/have been processed in a direction other than backward.

All the above-described embodiments of the tool 10 and the method can be used individually or in all possible combinations. In particular, all the features and/or functions of the above-described embodiments can be freely combined or also omitted. Furthermore, in particular the following modifications are conceivable.

The components illustrated in the Figures are illustrated schematically and may differ in terms of the precise construction from the forms shown in the Figures as long as the functions described above are ensured.

It is also possible to store more than two predetermined rotation angles 234, 235 in the control device 23 or in another storage device which is not illustrated. For example, it is thereby also possible to incorporate a plurality of steps, according to which the user is warned in order to ensure both reliable sliding of the mandrel or the portion 19 out of the tool element 18 and into the container 22.

However, the tool 10 may also be a tool other than a riveting tool, for which other tool the tool is intended to be arranged from the position thereof during the processing operation of the workpiece 3, 4 into a position different from the position during the processing of the workpiece 3, 4 after the workpiece 3, 4 has been processed and before the next processing operation of a workpiece 3, 4. For example, the tool 10 may also be a punching tool, etc.

In the tool 10 according to the first embodiment, therefore, the display device 233 is optionally not absolutely necessary.

The input device 24 is not absolutely necessary. The input device 24 may particularly also be provided at a central location and may be used for a plurality of tools of the production installation 1.

What is claimed is:

1. A tool, comprising:
   a tool element configured to receive a fixing element for processing a workpiece; and
   a control device configured to
   (i) evaluate a rotation angle, which is detected by a detection device, and with which the tool is arranged in space,
   (ii) after a processing operation of the workpiece with the fixing element has been carried out by the tool element and before another fixing element is received in the tool element for a subsequent processing operation, prevent operation of the tool element while the rotation angle detected by the detection device is less than a predetermined rotation angle,
   (iii) allow operation of the tool element after the rotation angle detected by the detection device reaches the predetermined rotation angle, and
   (iv) after a processing operation of the workpiece with the fixing element has been carried out by the tool element and before the rotation angle detected by the detection device has reached the predetermined rotation angle, generate a warning signal if the rotation angle indicates that the tool is tilted forwardly to such a degree that a used portion of a fixing element retained in the tool element can slide out of the tool.

2. The tool according to claim 1, further comprising:
   a container configured to receive a portion of a fixing element which is retained by the tool element,
   wherein the portion is produced as a result of the workpiece being processed with the tool element, and
   wherein an arrangement of the tool with the predetermined rotation angle in space after the workpiece has been processed brings about a movement of the portion into the container.

3. The tool according to claim 1, further comprising:
   a start switch configured to start a processing operation of the workpiece with the tool element,
   wherein the control device is configured to allow a switching operation of the start switch in a manner dependent on a result of the evaluation.

4. The tool according to claim 1, further comprising:
   an input device configured to receive input indicative of the predetermined rotation angle.

5. The tool according to claim 2, further comprising:
   a detection device configured to detect a rotation angle, through which the tool has been rotated after a processing operation of the workpiece; and
   a display device configured to display values detected by the detection device.

6. The tool according to claim 5, wherein the detection device has an acceleration sensor.

7. The tool according to claim 5, wherein the display device is configured to output a warning if the tool has not, after a workpiece has been processed, been rotated through the predetermined rotation angle and/or if the tool has not, after a workpiece has been processed, been rotated through a predetermined second rotation angle, at which the portion can fall out of the tool if the predetermined second rotation angle is further exceeded.

8. The tool according to claim 1, wherein the tool is a riveting tool.

9. A production installation for producing objects from at least one workpiece, the production installation, comprising:
   at least one tool, including:
      a tool element configured to receive a fixing element for processing a workpiece; and
      a control device configured to
         (i) evaluate a rotation angle, which is detected by a detection device, and with which the tool is arranged in space,
         (ii) after a processing operation of the workpiece with the fixing element has been carried out by the tool element and before another fixing element is received in the tool element for a subsequent processing operation, prevent operation of the tool element while the rotation angle detected by the detection device is less than a predetermined rotation angle, and
         (iii) allow operation of the tool element after the rotation angle detected by the detection device reaches the predetermined rotation angle, and
         (iv) after a processing operation of the workpiece with the fixing element has been carried out by the tool element and before the rotation angle detected by the detection device has reached the predetermined rotation angle, generate a warning signal if the rotation angle indicates that the tool is tilted forwardly to such a degree that a used portion of a fixing element retained in the tool element can slide out of the tool,
   wherein the at least one tool processes the workpiece.

10. The tool according to claim 1, wherein the tool element is configured to receive a blind mandrel.

11. The tool according to claim 8, wherein the tool element is configured to receive a blind mandrel.

* * * * *